United States Patent [19]
Brennesholtz

[11] 3,805,048
[45] Apr. 16, 1974

[54] SWITCH
[75] Inventor: Aaron House Brennesholtz, Wilmington, Del.
[73] Assignee: E. I. du Pont de Nemours and Company, Wilmington, Del.
[22] Filed: Sept. 14, 1972
[21] Appl. No.: 289,146

[52] U.S. Cl............. 240/8.16, 240/1 EL, 350/96 R
[51] Int. Cl.............................................. B60q 3/04
[58] Field of Search ............ 240/1 EL, 8.16; 350/96

[56] References Cited
UNITED STATES PATENTS
3,278,739  10/1966  Royka et al.................... 240/8.16 X Primary Examiner—Samuel S. Matthews
Assistant Examiner—Richard A. Wintercorn

[57] ABSTRACT

A switch device especially adapted for use in the instrument panel of automobiles is provided, said switch includes a body, support means secured to said body and adapted to engage and support at least one lamp, control means connected to said body and adapted to energize said lamp and cause illumination thereof, light transmitting means secured to said body and adapted to transmit light from said lamp to a remote point when said lamp is illuminated, and means disposed between said support means and said light transmitting means and adapted to be actuated by said control means for varying the amount of light from said lamp to said light transmitting means.

3 Claims, 3 Drawing Figures

PATENTED APR 16 1974　　　　　　　　　　　　3,805,048

SWITCH

FIELD OF THE INVENTION

The present invention relates to an article of manufacture and, more particularly, is directed to a novel switch device especially adapted for use in the instrument panel of automobiles.

BACKGROUND OF THE INVENTION

Controlling the illumination of the dashboard or instrument panel of automobiles requires a plurality of light bulbs each connected to a costly rheostat unit normally incorporated in a switch device. The switch device is usually manipulated manually to operate the rheostat unit thereof for providing so-called dimmer control for varying the intensity of instrument panel illumination. A principal object of the present invention is to provide a new switch device which is especially adapted to control the instrument panel illumination in automobiles without using costly rheostats and a plurality of light bulbs or lamps.

THE INVENTION

According to the present invention there is provided an article of manufacture comprising a switch having a body, support means secured to said body and adapted to engage and support at least one lamp, control means connected to said body and adapted to energize said lamp and cause illumination thereof, light transmitting means secured to said body and adapted to transmit light from said lamp to a remote point when said lamp is illuminated, and means disposed between said support means and said light transmitting means and adapted to be actuated by said control means for varying the amount of light from said lamp to said light transmitting means.

DETAILED DESCRIPTION

The nature and advantages of the present invention will be more clearly understood by the following description and the several views illustrated in the accompanying drawings wherein like reference characters refer to the same parts throughout the several views and in which.

Figure 1:
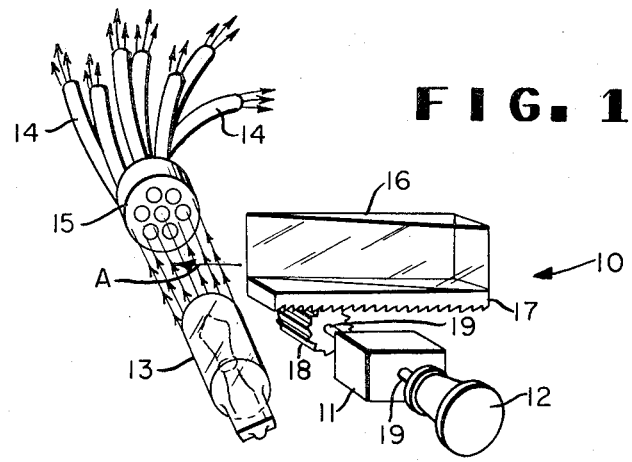
FIG. 1 is a schematic view showing the construction and arrangement of the parts of a switch device of the invention.

The switch device 10 herein disclosed in illustration of the invention, as depicted in FIG. 1, includes a conventional switch box 11 adapted to energize the lamps in an automobile upon actuation thereof by means of conventional knob 12. For example, knob 12 pulls out to automatically turn on the lamps in an automobile such as, for example, the customary headlights and instrument panel lamps. In the switch device of FIG. 1, pulling knob 12 energizes light bulb 13. The switch 10 also includes optical fiber elements 14 shown in a cluster arrangement secured at one end thereof in any suitable manner as by a ferrule 15. Another feature of the switch of the invention is a variable light density filter 16 and, as shown in FIG. 1, this may be in the form of a wedge-shaped, smoke-colored translucent plastic member. Variable light density filter 16 is shown secured to a rack 17 adapted to engage pinion 18 supported at the end of shaft 19 connected to knob 12 and switch box 11. In operation, knob 12 pulls out to automatically turn on bulb or lamp 13 and simultaneously engage rack 17 and pinion 18. A twist of knob 12 in a counter-clockwise direction moves the wedge-shaped, smoke-colored translucent plastic member 16 in the direction of arrow A and into position between light bulb 13 and the open or input ends 20 of clustered optical fiber elements 14 which transmit or "pipe" the light from bulb 13 to the indicator instruments on the instrument panel of, for example, an automobile. Movement of the plastic member 16 across the light beam projected by bulb 13 provides progressive dimming of instrument panel lighting in direct relationship to the thickness of plastic member 16.

Figure 2:
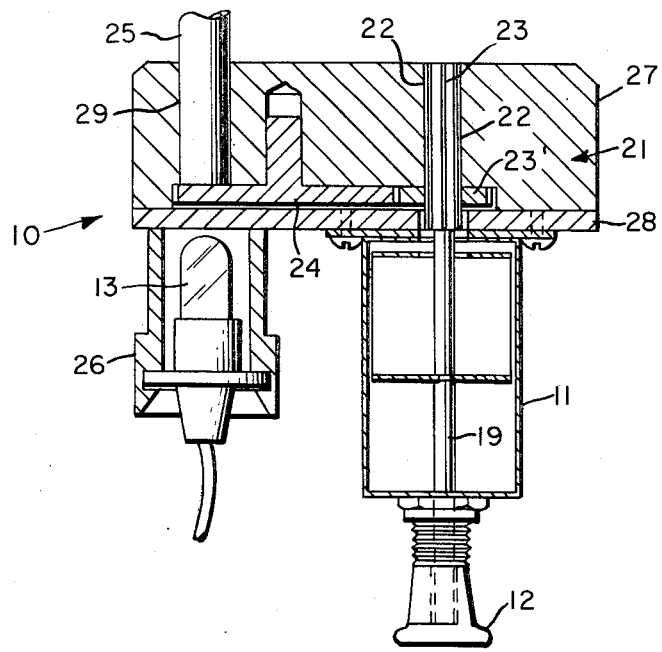
FIG. 2 is a plan view in cross-section of the construction and arrangement of another embodiment of the switch device of the invention.
Figure 3:
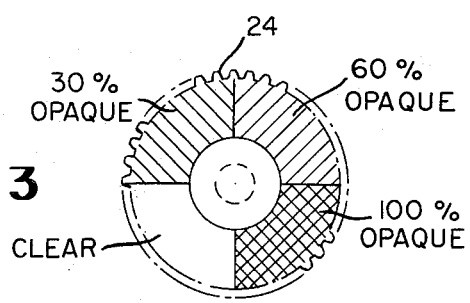
FIG. 3 is a front view of a variable density light filter of the switch of FIG. 2.

The embodiment of the switch device 10 shown in FIG. 2 includes a body member 21 having attached thereto a conventional switch box 11 actuated by pull knob 12 which is secured to one end of shaft 19 which extends through switch box 11 and into aperture 22 in body member 21. A gear element 23 is secured to the other end of shaft 19, and gear element 23 cooperatively engages gear 23' which engages the peripheral edge of a variable density light filter element which in this embodiment of the switch is a disc element 24. Rotation of pull knob 12 turns gears 23 and 23' and results in the rotation of disc 24. A portion of disc element 24 rotates between lamp 13 and the bundle 25 of optical fiber elements 14 which extend to the various indicator instruments on a panel such as the instrument panel of an automobile. Disc element 24 has segments of different light transparency (FIG. 3) and rotation of disc 24 provides progressive dimming of the instrument panel lighting in direct relationship to the light transparency of disc 24. As shown in FIG. 2, light bulb 13 is secured in a support member 26 attached to body 21. For ease of fabrication and assembly of the light switch, body 21 is preferably provided in two parts, namely, base member 27 and plate member 28 wherein plate member 28 may be secured by any suitable means to base member 27. The bundle 25 of optical fiber elements 14 may be secured in any suitable fashion as in aperture 29 of body base member 27.

A particularly significant advantage of the switch device of the present invention is that it is used in conjunction with only a single low-wattage light bulb to illuminate the many legends and instruments on the instrument panel of automobiles. The fiber optic light guides utilized in switch may be of Crofon brand light guides which will last the life of an automobile.

What is claimed is:

1. An article of manufacture comprising a switch having a body, support means secured to said body and adapted to engage and support at least one lamp, control means connected to said body and adapted to energize said lamp and cause illumination thereof, light transmitting means secured to said body and adapted to transmit light from said lamp to a remote point when said lamp is illuminated, and a variable density light filter disposed between said support means and said light transmitting means, and adapted to be actuated by said control means for varying the amount of light from said lamp to said light transmitting means.

2. The article of claim 1 wherein said variable density light filter comprises a wedge-shaped, colored translucent member movably mounted intermediate said support means and said light transmitting means so constructed and arranged when actuated by said control means to travel across the light beam adapted to be projected by said lamp and vary the amount of light incident upon said light transmitting means.

3. The article of claim 1 wherein said variable density light filter comprises a rotatably mounted translucent disc member having segments of different light transparency so constructed and arranged when actuated by said control means to intersect the light beam adapted to be projected by said lamp and vary the amount of light incident upon said light transmitting means.

* * * * *